United States Patent [19]

Vogel

[11] Patent Number: 4,607,860

[45] Date of Patent: Aug. 26, 1986

[54] FOLDING WHEELCHAIR

[76] Inventor: Ignaz Vogel, Kleinsteinbacher Str. 44, 7500 Karlsruhe 41-Stu, Fed. Rep. of Germany

[21] Appl. No.: 660,810

[22] Filed: Oct. 15, 1984

[30] Foreign Application Priority Data

Oct. 13, 1983 [DE] Fed. Rep. of Germany ....... 3337263

[51] Int. Cl.[4] .................................................. B62B 3/02

[52] U.S. Cl. ............................ 280/650; 280/242 WC; 280/657

[58] Field of Search ....... 280/658, 242 WC, 289 WC, 280/648, 657, 650, 647; 414/921; 297/344, 346; 4/251, 254, 480

[56] References Cited

U.S. PATENT DOCUMENTS

| | | | |
|---|---|---|---|
| 3,271,785 | 9/1966 | Du Bose | 4/480 |
| 3,889,963 | 6/1975 | Brattgard | 280/650 |
| 4,031,576 | 6/1977 | Epstein | 4/251 |
| 4,514,867 | 5/1985 | Jensen | 4/480 |

FOREIGN PATENT DOCUMENTS

| | | | |
|---|---|---|---|
| 379191 | 9/1906 | France | 297/344 |
| 171193 | 11/1921 | United Kingdom | 297/344 |
| 2048791 | 12/1980 | United Kingdom | 280/242 WC |
| 2078176 | 1/1982 | United Kingdom | 280/242 WC |

*Primary Examiner*—John J. Love

*Assistant Examiner*—Eric Culbreth

*Attorney, Agent, or Firm*—Klaus J. Bach

[57] ABSTRACT

In a folding wheelchair for the handicapped which includes a seat mounted on a lower frame provided with casters, the seat is supported on a pair of hinged rear struts which are lockable in an upright position and a pair of front links which are hinged to the front edge of the seat and pivotally connected to the lower frame at an intermediate location essentially along an axis extending laterally below the center of the seat. At its rear end, the seat carries a laterally disposed roller adapted to roll on a support structure against which the wheelchair is backed so that the seat is movable backwardly from its front end position by pivoting the front links backwardly to a rear end position while the seat, rolling with its rear lateral roller on said support structure follows, with its front end, the arc defined by the pair of front links which provides for lowest seat locations at the seat's front and rear end positions so that the seat, by its own weight and the weight of any person thereon, automatically moves toward one or the other of its end positions. The seat includes a frame member and a center portion which is pivotally supported at the front of said frame member so as to be capable of being pivoted down before the seat is moved back onto said support structure.

9 Claims, 4 Drawing Figures

FOLDING WHEELCHAIR

BACKGROUND OF THE INVENTION

The invention relates to a folding wheelchair for the handicapped especially for use in connection during travels on land or water vehicles or in airplanes which generally have no space for the handicapped person's own especially designed wheelchair. The folding wheelchair according to the present invention is particularly adapted to permit a disabled person to use the on-board toilet facilities of a vehicle which, because of the small space available, would not normally be possible even if the disabled person had his or her own wheelchair on board. For good space utilization, it is desirable that such a wheelchair is collapsible so that it can easily be stowed away. Further, for ease of handling and small deadweight, it is necessary that such a wheelchair is lightweight but nevertheless sturdy when in use and that it is also easily foldable and unfoldable.

One folding wheelchair design known in the art consists of a subframe provided with swivel casters and having hinged thereto telescopic support tubes which may be tilted up and whose length may be hydraulically adjusted. A seat including a backrest is supported on the telescopic support tubes by means of a pair of rails on which the seat is movable back and forth. The seat itself includes a hinged center portion which may be pivoted downwardly and out of the way whereupon the seat may be moved backward above a toilet so that the disabled person may use the toilet without assistance while remaining seated in the wheelchair.

In order for this wheelchair to be foldable it includes between the seat and the backrest, and also between the seat and the support tubes or rather the tracks mounted thereon, a shaft extending crosswise and permitting the backrest to be pivoted down onto the seat and, upon downward pivoting of the support tubes, the seat to be lowered onto the subframe.

A disadvantage of the described wheelchair is that the pair of hydraulically operated support tubes together with the tracks for the support of the seat result in a heavy design so that such a seat becomes quite heavy and difficult to handle. Not only is such a wheelchair hard to fold and unfold but, at the same time, it is difficult to use and manipulate the wheelchair which task has to be performed by the handicapped, especially when using the toilet facilities.

It is therefore the principal object of the present invention to provide a wheelchair of the type referred to above, which wheelchair, however, is relatively light in weight but nevertheless sturdy enough to fulfill all requirements on such a chair and which is easy to use for a disabled person to that such person is able to manipulate the wheelchair for all its intended uses.

SUMMARY OF THE INVENTION

This object is achieved by a wheelchair which has a seat supported on a lower frame by a pair of hinged rear struts which are lockable in an upright position and a pair of front links which, at their upper ends, are hinged to the front edge of the seat and, at their lowers ends, are pivotally connected to the lower frame along an axis extending laterally essentially below the center of the seat. The wheelchair is movable on the floor by casters mounted on the lower frame and the seat is movable from the lower frame rearwardly onto a support structure by way of a roller which is mounted to the rear end of the seat and adapted to roll backwardly onto the support structure by pivoting the front links backwardly from a front end to a rear end position along an arc defined by the links such that the seat moves automatically toward its lower front or rear end positions. The seat of the wheelchair consists of a seat frame and a center portion which is pivotally connected to the front portion of the seat frame so that the center portion may be pivoted down when the seat is moved backwardly onto a toilet.

Instead of a pair of support tubes which have to be very sturdy and heavy in order to withstand the bending loads, the arrangement according to the present invention has the seat and seat back supported by a support structure consisting of pairs of lightweight links and struts which are attached to the seat at its front and rear end corners respectively, and which are subjected only to longitudinal stresses. The front links are pivotally connected to the subframe rearwardly of their point of attachment to the seat so that, upon unlocking and backward movement, the seat with seat back is first raised at the front end but then lowered again toward its rear end point of travel so that it is moved safely to its rear end position. Generally, a disabled person is able to operate such a pivot mechanism since the person's upper body and, especially, the arms are usually operative.

In anticipation of the use of vehicle toilets by disabled persons, the toilets in vehicles, such as airplanes or land vehicles, have tracks mounted on the side walls of the toilet cabin which permit the back and foward movement of the seat of a wheelchair by supporting a roller at the rear end of the seat. Return of the seat to its normal position is possible by forward pivoting of the front links wherein the seat is again automatically moved toward its front end position after an initial pivot effort. Upon forward movement of the seat the weight of the seat with the occupant may further be utilized to pivot the seat center portion from its downward out-of-the-way position upwardly into its normal position parallel to the seat frame and to lock it in this position.

It has been found that it is especially the operation of the seat center portion which causes the greatest difficulties in prior art wheelchairs, and most disabled persons were unable to overcome the difficulties associated with the downward and upward pivoting of the seat center. In the arrangement according to the present invention the seat center is automatically pivoted down when the seat is moved back and it is automatically returned to its normal position in the seat when the seat is moved forward to its front end position without the need for special manipulation by the disabled person.

In accordance with the present invention the rear struts are utilized as vertical guide tracks for the seat center portion which is pivotally mounted at the front end of the seat and has guide bolts at its free rear end, which guide bolts are engaged in the guide tracks and pivot the seat center portion downwardly when the seat is moved backward to permit the use of a toilet. Upon forward movement of the seat, the seat center portion is, again guided by movement of the guide bolts in guide tracks, pivoted upwardly into the seat where it may then merely be locked in position.

Although the pivot movement of the front links insures that the seat is moved securely into its front and rear end positions and remains there, it is nevertheless advisable to lock the seat in those end positions. For this purpose there may be provided a locking mechanism, including locking jaws mounted to the rear edge of the seat and adapted to engage a lock stud mounted on the rear support links and the guide bolt of the seat center portion. This locking mechanism locks the seat in its normal position for transporting the disabled person on the chair. A similar locking mechanism may be provided at the front end of the seat so as to permit locking of the seat in its rear end position. Preferably, such locking mechanism is self-actuated in order for the disabled person to save the efforts of locking the seat.

It is noted that, preferably, the seat frame as well as the seat center portion consist of plastic which may be fiber reinforced since these parts are supported on the support links and on the roller which again is supported on the toilet so that they are not subjected to heavy loads. These elements may therefore be very light in weight.

It is advisable to provide a gap between the seat frame and the seat center portion in order to avoid jamming of the seat center portion, that is, to insure easy operation and to prevent clothing or body skin from being squeezed in but also to save some weight.

Preferably, downwardly extending mounting legs are connected to the front edge of the seat, which mounting legs carry a footrest at their lower ends. The distance between these two mounting legs is slightly smaller than the distance between the front support links so that the two mounting legs may be pivoted back between the front support links upon folding of the wheelchair. Preferably, the footrest has the shape of a shovel, that is, it consists of a support panel with raised side and back edges so as to prevent the feet of the disabled person from sliding off the footrest. In order to prevent tipping of the wheelchair when a person's weight is placed on the footrest, a support member is pivotally mounted below the footrest so that, in its downward pivoted position, it bridges the distance between the footrest and the floor. The support member is preferably so arranged that it may be pivoted backwardly so that it will not inhibit movement of the wheelchair when the floor is not flat.

On the other hand, the wheelchair must be lockable in a particular location so that it will not roll away when this is not wanted. For this reason, the wheelchair has mounted on its lower frame downwardly projecting and downwardly movable locking blocks which may be arrested in their locking positions in engagement with the floor.

Preferably, the seat frame and also the seat center portion are pivotally supported on the front links by means of a shaft which also serves as a carrying handlebar for the wheelchair in its folded state.

SHORT DESCRIPTION OF THE DRAWINGS

DESCRIPTION OF THE PREFERRED EMBODIMENT

Figure 1:
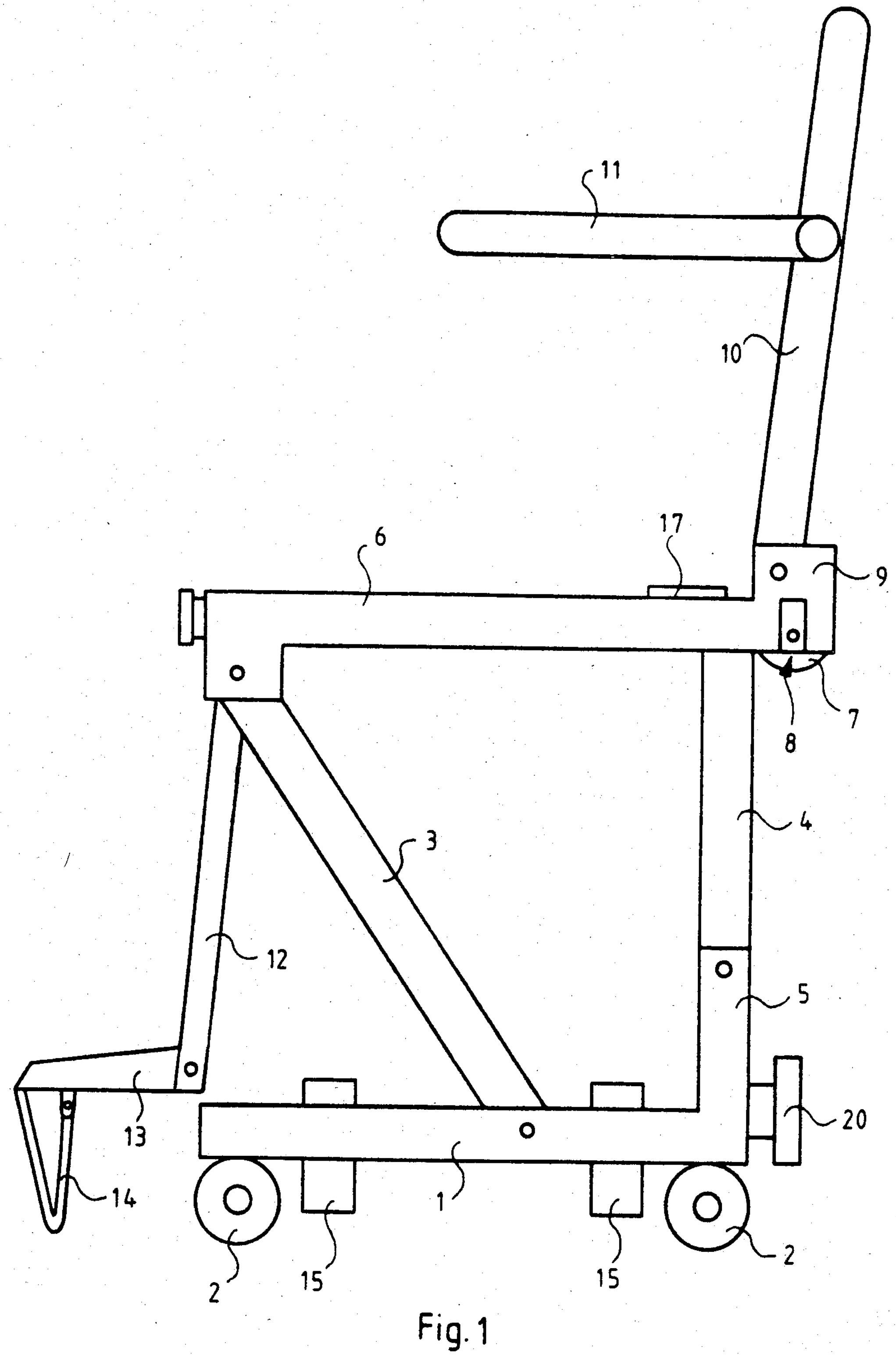
FIG. 1 is a side view of the wheelchair in an unfolded state ready for use.

The wheelchair includes a lower frame 1 with swivel casters 2 arranged at the corners, a pair of front links 3 and a pair of rear struts 4 attached to the frame 1 and a seat 6 supported on the pairs of links 3 and struts 4. The rear struts 4 are connected to upstanding columns 5 which are part of the lower frame 1. The front links 3 are directly attached to the lower frame 1 about in the middle or slightly rearward of the middle of the side members of the lower frame and to the seat at the front edge thereof, the rear end of the seat being supported by the upright struts 4. At its rear edge the seat 6 carries a roller 7 extending across the width of the seat 6, which roller 7 is supported adjustably in height in a slot 8. Supported by the roller 7 the seat 6 may be rolled backwardly onto a toilet. The height adjustment structure permits the roller 7 to be disposed in a somewhat inclined manner so that unevenness of the toilet top surface or of the floor in front of the toilet may be accommodated. At its rear end the seat 6 has a projection 9 on which a backrest 10 is pivotally supported, which backrest 10 carries pivotal armrests 11. Support legs 12 are linked to the front end of the seat 6 and provided with a support plate 13 which serves as a footrest. Safety struts 14 are mounted to the underside of the footrest and project downwardly so as to bridge the space between the footrest and the floor. The support plate 13 and the safety struts 14 are pivotally mounted so as to facilitate folding of the wheelchair into a small package. The bottom frame 1 is further provided with brake blocks 15 which are movable from an uppper release position downwardly into engagement with the floor for locking the wheelchair in position.

Figure 2:
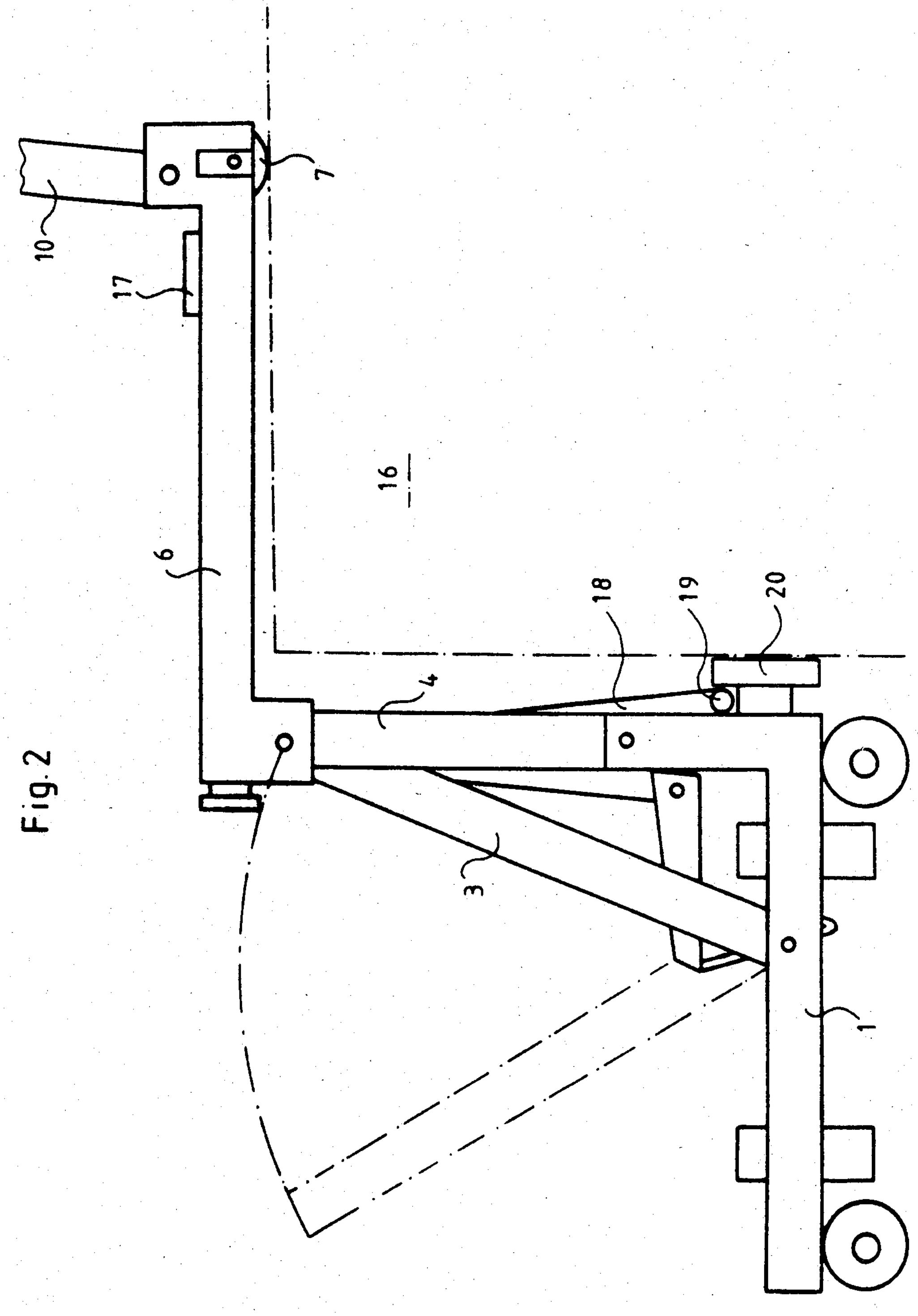
FIG. 2 shows the wheelchair with the seat moved back.
Figure 3:
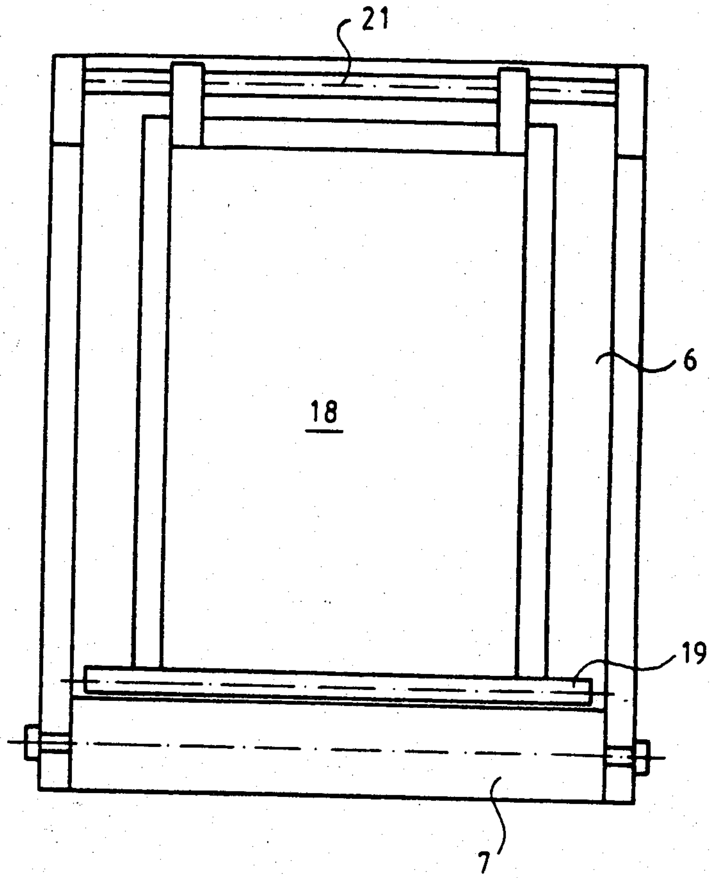
FIG. 3 is a bottom view of the wheelchair.

For use of a toilet 16, which is indicated in FIG. 2 by a dash-dotted line, the seat 6 is moved into a backward position as shown in FIG. 2. For this purpose a mechanism locking the seat 6 to the rear struts 4 is released by a release button 17 so that the seat 6, with rear roller 7 disposed on the top surface of the toilet, may be moved backward while the front links 3 are pivoted back as indicated in FIG. 2 in dash-dotted lines. The pivot movement of the front links has the advantage that the seat is lowered slightly into its end positions so that, consequently, it tends to move automatically into the end positions. Before backward movement of the seat 6, however, a center portion 18 is released also by pushing of the release button 17 whereby the seat center portion 18, riding on the struts 4 by means of guide rollers 19, pivots downwardly into the lowered position shown in FIG. 2. When the seat is moved forwardly again, the guide rollers 19 roll upwardly on the struts 4 so that the seat center portion 18 is pivoted back to its original position. Movement of the seat center part is automatic so that difficult manipulations for operating the seat center portion 18 are not necessary. At its rear end the lower frame 1 has an adjustable bumper 20 with which the wheelchair abuts the toilet for exact positioning of the wheelchair relative to the toilet such that the roller 7 is disposed on top of the toilet and the seat 6 can be moved backwardly without any problems.

Figure 4:
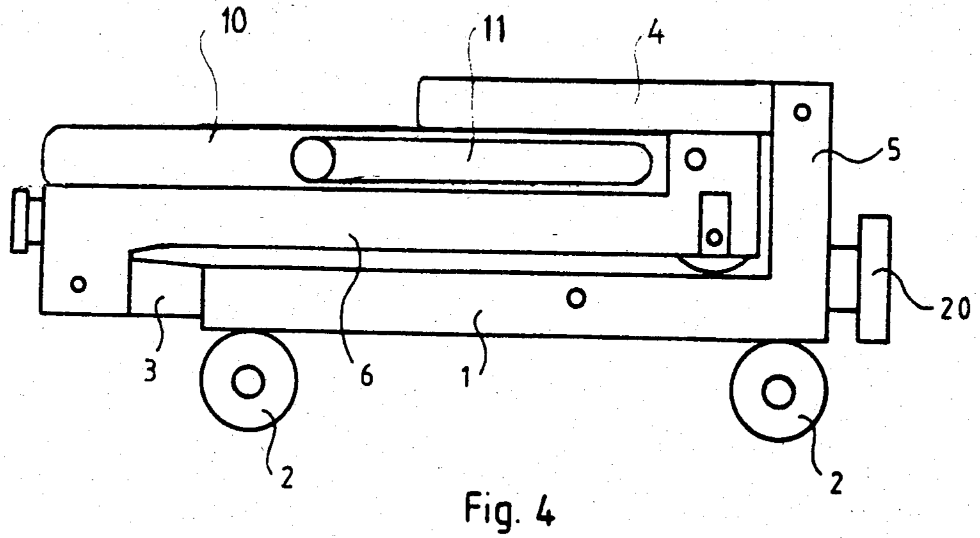
FIG. 4 shows the wheelchair folded together.

FIG. 4 shows the wheelchair folded. After pivoting of the safety struts onto the footrest and the footrest onto the legs 12, the legs 12 are pivoted between the links 3. Then the locking mechanism between the seat 6 and the struts 4 is released and the seat 6 is lowered onto the lower frame 1. The backrest 10 is then pivoted down onto the seat 6 and finally the struts 4 are tilted onto the package and locked in this position, thereby providing a package which is easily handled and which can be easily carried when held by the pivot shaft 21.

I claim:

1. A folding wheelchair for disabled persons, comprising: a lower frame; a number of casters mounted on the lower frame; a seat with a backrest pivotally mounted thereon so as to permit folding thereof onto said seat, said seat being supported on said lower frame by a pair of front links and a pair of rear struts, said front links being pivotally connected to the front of said seat and being hinged to said lower frame at an intermediate location substantially along an axis extending laterally below the center of said seat, said pair of rear struts being shorter than said front links and pivotally connected to an upstanding column of said lower frame, said front links and said rear struts being pivotable forwardly to a lower position in which said seat is folded onto said lower frame and backwardly to an upward pivoted position for normal use of said seat, said pair of rear struts being upright in such normal seat use position so as to provide support for said seat, said seat carrying at its rear end a laterally extending roller adapted to roll on a support structure against which said wheelchair is backed so that said seat is movable between front and rear end positions by pivoting of said front links, said front and rear end positions being lower than any intermediate position so that said seat by its weight and the weight of any person thereon automatically moves into one of said end positions, said seat having a frame and a center portion which is pivotally supported at the front of said frame so as to be capable of being pivoted down out of said seat frame.

2. A wheelchair according to claim 1, wherein said seat center portion has, at its rear end, guide rollers engaging said rear struts and being movable thereon downwardly when said seat is moved back and again upwardly when said seat is again moved to the front.

3. A wheelchair according to claim 1, wherein said seat frame and said seat center portion consist of fiber-reinforced plastic.

4. A wheelchair according to claim 1, wherein said seat center portion is spaced from said seat frame.

5. A wheelchair according to claim 1, wherein said seat frame has downwardly projecting support legs pivotally mounted thereon, said support legs carrying a footrest at their lower ends and being spaced that the distance between their outer edges is slightly less than the free space between said links so that they are pivotable into the space between said links.

6. A wheelchair according to claim 5, wherein said footrest is a plate with upstanding side and rear walls and is pivotable into the space between said support legs.

7. A wheelchair according to claim 6, wherein safety struts are mounted on said footrest so as to be pivotable backwardly onto said footrest, said safety struts having a length so as to be capable of bridging the space between said footrest and a floor below on which said wheelchair is disposed.

8. A wheelchair according to claim 7, wherein said lower frame has brake blocks mounted thereto in its corners, said blocks being movable between a lower braking position in which they are in engagement with the floor below and an upper release position.

9. A wheelchair according to claim 1, wherein the front links are hinged to said seat by a shaft which is arranged and formed so as to serve as a carrying handle for the chair when folded.

* * * * *